United States Patent
Fischer (10) Patent No.: US 11,868,501 B2
(45) Date of Patent: Jan. 9, 2024

(54) SYSTEM DEVICE AND METHOD FOR MANAGING ACCESS TO DATA IN AN AUTOMATION ENVIRONMENT

(71) Applicant: SIEMENS AKTIENGESELLSCHAFT, Munich (DE)

(72) Inventor: Jan-Gregor Fischer, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/909,389

(22) PCT Filed: Jan. 29, 2021

(86) PCT No.: PCT/EP2021/052120
§ 371 (c)(1),
(2) Date: Sep. 4, 2022

(87) PCT Pub. No.: WO2021/175519
PCT Pub. Date: Sep. 10, 2021

(65) Prior Publication Data
US 2023/0100864 A1    Mar. 30, 2023

(30) Foreign Application Priority Data
Mar. 4, 2020 (EP) .................................... 20160951

(51) Int. Cl.
*G06F 21/62* (2013.01)
*G06F 21/64* (2013.01)

(52) U.S. Cl.
CPC .......... *G06F 21/6227* (2013.01); *G06F 21/64* (2013.01)

(58) Field of Classification Search
CPC ............................. G06F 21/6227; G06F 21/64
(Continued)

(56) References Cited

U.S. PATENT DOCUMENTS 10,049,214 B2 *  8/2018  Ferrie ................. G06F 21/6218
2015/0058997 A1 *  2/2015  Lee ..................... G06F 9/45558
726/26
(Continued)

FOREIGN PATENT DOCUMENTS

WO    0113198 A1    2/2001

OTHER PUBLICATIONS

Decision to Grant a European Patent for European Patent Application No. EP 21704432.0 dated Feb. 2, 2023.
(Continued)

*Primary Examiner* — Joshua Bullock
(74) *Attorney, Agent, or Firm* — Lempia Summerfield Katz LLC (57) ABSTRACT

A system device and a method for managing access to data in an automation environment are disclosed. The data is associated with assets in an automation environment, where the data includes one of restricted data and unrestricted data. The automation environment is accessible via one or more computing platforms including a plurality of computing resources that are classifiable into a trusted computing platform and a non-trusted computing platform. The method includes classifying analytics operations performable on the data into a first operation set that is executable on the trusted computing platform. The analytics operations are associated with one or more applications executable on at least one of the computing platforms. The method includes enabling access to at least one of the unrestricted data and a first unrestricted output of the first operation set outside the trusted computing platform by a communication operation.

18 Claims, 5 Drawing Sheets

(58) Field of Classification Search
USPC .......................................................... 707/783
See application file for complete search history.

(56) References Cited

U.S. PATENT DOCUMENTS

2023/0244782 A1* 8/2023 Fischer ............... G06F 21/6218
726/26
2023/0262045 A1* 8/2023 Ahokas ............... H04L 63/0807
726/6

OTHER PUBLICATIONS

PCT International Search Report and Written Opinion of International Searching Authority dated Jan. 31, 2022 corresponding to PCT International Application No. PCT/EP2021/052120.

* cited by examiner

SYSTEM DEVICE AND METHOD FOR MANAGING ACCESS TO DATA IN AN AUTOMATION ENVIRONMENT

This application is the National Stage of International Application No. PCT/EP2021/052120, filed Jan. 29, 2021, which claims the benefit of European Patent Application No. EP 20160951.8, filed Mar. 4, 2020. The entire contents of these documents are hereby incorporated herein by reference.

BACKGROUND

The present embodiments generally relate to the field of Internet-of-Things, and more particularly, relate to a method, device, and system for managing access to data in an Internet-of-Things (IoT) environment/Automation environment.

In an Automation environment, such as Industrial IoT environment, interface devices are connected to an IoT cloud platform and sensors and actuators via the Internet. The interface devices are often referred as edge devices.

The edge devices may be light weight, low cost devices that collect data from various sensors and actuators deployed in a plant, store and buffer the collected data, conduct analysis of the collected data, and perform an action (e.g., issuing a control command) based on the outcome of analysis. The edge devices may also be configured to aggregate, filter, selectively report, compress, encrypt, and/or otherwise pre-process the data, resulting in less data and/or value added data being communicated to the IoT cloud platform. Accordingly, the edge devices provide that the data associated with the automation environment is processed within the automation environment. Further, the edge devices may communicate the data to the IoT cloud platform in a controlled manner. Therefore, usage of the edge devices may enable faster processing of the data while preserving privacy of the data.

An example to provide privacy includes data encryption by the application of digital rights management technology. The application of data encryption techniques may involve considerable overhead for computation and memory resources. The overhead may be particularly significant in case of the edge devices. Accordingly, the systems, devices, and methods for managing access to the data may benefit from improvements.

SUMMARY AND DESCRIPTION

The scope of the present disclosure is defined solely by the appended claims and is not affected to any degree by the statements within this description.

In an example, a method for managing access to data associated with assets in an automation environment is disclosed. The data includes one of restricted data and unrestricted data. The automation environment is accessible via one or more computing platforms including a plurality of computing resources that are classifiable into a trusted computing platform and a non-trusted computing platform. The method includes classifying analytics operations performable on the data into a first operation set that is executable on the trusted computing platform. The analytics operations are associated with one or more applications executable on at least one of the computing platforms. The method includes enabling access to at least one of the unrestricted data and a first unrestricted output of the first operation set outside the trusted computing platform by a communication operation.

In another example, a device for managing access to data associated with assets in an automation environment is provided. The data includes one of restricted data and unrestricted data. The device includes an operating system and a trusted processing module including computer-readable instructions that, when executed by the operating system, are configured to perform the method described herein.

In yet another example, a system for managing assets in an automation environment is provided. The system includes one or more computing devices configured to execute one or more applications for managing the assets. The one or more computing devices are classifiable into a trusted computing platform and a non-trusted computing platform based on a trust policy. The trusted computing platform includes the above mentioned device, where the computing devices classified as the trusted computing platform is an integrated trusted platform.

A further example may include a non-transitory computer readable medium encoded with executable instructions (e.g., a software component on a storage device) that, when executed, causes at least one processor to carry out this described method.

Before describing the suggested convention in more detail, various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments. Features explained in the context of the suggested method may also be comprised by the suggested system by appropriately configuring and adapting the system and vice versa.

The assets may be control devices, sensors, and actuators (e.g., Computer Numerical Control (CNC) machines, automation systems in an industrial production facility, motors, generators, and the like). The automation environment refers to a facility that for manufacture, production may be semi or completely automated (e.g., industrial automation environment, laboratory automation environment, building automation environment, and the like). Further, according to the present embodiments, automation environment may include a combination of one or more industrial automation environments, laboratory automation environments, and building automation environments.

The automation environment has multiple of data that may be generated within the environment or may be associated with the environment. For example, sensor data may be generated within the automation environment, and the control data may be associated with the environment even if the control data is not generated within the environment. Such data may be sensitive and is referred hereinafter as restricted data. The restricted data may be referred to as unprotected data to indicate that the restricted data is not protected and therefore cannot leave the trusted platform. The data that is not sensitive may be referred to as unrestricted data. The restricted data may be converted to unrestricted data by performing one or more transformative functions. Through these functions, the unprotected data may be converted into protected data.

A non-limiting example of restricted data includes high accuracy sensor data that is restricted data if transmitted to the external users at its original rate of generation. In another example, high accuracy sensor data is unrestricted data if transmitted to the external users at a slow sampling frequency. Another example of restricted data includes data points associated with a detected anomaly in the operation of the assets. The detected anomaly may be unrestricted data while the associated data points may be restricted data.

In an embodiment, the method may include determining whether the data associated with the automation environment is restricted data or unrestricted data. Accordingly, the method may include identifying the restricted data in the data associated with the assets. In an embodiment, identification of the restricted data may include identifying high-frequency signals in the data as the restricted data based on a frequency threshold. In another embodiment, identification of the restricted data may include identifying high bandwidth datapoints in the data as the restricted data based on a bandwidth threshold of at least one of the computing resources/devices.

Further, the method may include identifying the restricted data associated with the assets based on one or more constraints associated with the data and/or the computing resources. The constraints may include data size, velocity of the data, time of data generation, location of data generation, assets generating the data, computing resources processing the data, time of data processing, type of the data, quality of the data, probability of correctness of the data, consistency of the data, completeness of the data, structure of the data, semantics of the data, confidentiality of the data, or any combination thereof.

As used herein, "application" refers to software code that is used to perform a function using data from the automation environment. For example, the application is a web-based condition monitoring application configured to monitor condition of the assets in the automation environment. The application may be hosted on one or more devices. The devices may be trusted or not. The present embodiments allow an application hosted on a non-trusted device to use both restricted data and unrestricted data for execution of the application, while providing that only unrestricted data is communicated outside the trusted platform.

The present embodiments determine whether a computing resource is classifiable as the trusted computing resource or the non-trusted computing resource. In an embodiment, the method may include classifying the plurality of computing resources as the trusted computing platform and/or a non-trusted computing platform based on a trust policy between the computing resources. The trust policy depends on communication protocol, digital certificates, and/or cryptographic signatures associated with the data and/or the computing resources.

In an embodiment, the computing resources may be a computing device including a data bus. The data bus may be configured to communicate the data associated with the assets to the trusted processing module. Further, the data bus may be configured to communicate the unrestricted data to one or more applications hosted on one of the computing platforms.

For example, an IoT platform may belong to the computing infrastructure of a third party different than the party responsible for the automation environment. However, the third party may be certified in a legal and technical way by the owner of automation environment. If the IoT platform itself and all communication between the IoT platform and the automation environment is secured from a legal and technical perspective, then, accordingly, in such an example, the IoT platform may be classified to be within the trusted computing platform.

A combination of the trusted computing resources may be referred to a trusted computing platform. Therefore, the method may include enabling communication between one or more trusted computing resources to form the trusted computing platform. The trusted computing platform may act as an integrated overarching platform across multiple asset types and trusted computing resources. For example, the CNC controller in an industrial facility is associated with a first trusted computing resource, and an automation system of the industrial facility is associated with a second computing resource. The first trusted computing resource and the second trusted computing resource are configured to communicate with each other to execute the application. Further, the industrial facility may be accessible via a cloud computing platform that is authorized to access the restricted data and unrestricted data. In such a scenario, the trusted computing platform includes the combination of the first trusted computing resource and the second trusted computing resource and the cloud computing platform.

The application that uses the restricted data and the unrestricted data is analyzed. The method may include analyzing the application to determine whether restricted data and/or the unrestricted data is required for execution. The analysis provides that only unrestricted data is accessed outside the trusted computing platform. Further, the analysis may be performed at different stages of the application (e.g., before deployment and/or during runtime). The analysis may be performed by manual code review of the application. In another embodiment, the application may consist of multiple services that, in combination, are accessible through a single entry point, such as a plugin. The plugin may be configured such that only unrestricted data is accessed outside the trusted computing platform. Therefore, the present embodiments overcome the need to encrypt every data point.

In an embodiment, the analysis may be performed by representing the applications as the analytics operations based on one of an input data required for the applications, a predicted output data, a transformation function between the input data and the output data. For example, the input data may be both restricted data and unrestricted data associated with the automation environment. By breaking down the application into operations, it will be easy to identify what operations require restricted data and result in restricted outputs. Such analysis enables classification of the operations in the first operation set where only execution of the operation is possible. The method may accordingly include classifying the analytics operations as the first operation set based on requirement of the restricted data for the execution of the analytics operations. In furtherance to the classification, communication of the results of the first operation set may be possible only in case of unrestricted output and by a separate communication operation.

The method may include executing logic of the applications by the first operation set using the restricted data and/or the unrestricted data, and generating an output of the first operation set based on the executed logic. The output is classifiable as a first restricted output and the first unrestricted output. Accordingly, the output of the first operation set may be restricted or unrestricted. If unrestricted, the output of the first operation may be made available outside the trusted computing platform via the communication operation. In case the output is the first restricted output, further processing is performed by a second operation set.

In an embodiment, the first operation set may include multiple operations. For example, the first operation set may be performed by multiple computing resources distributed in the automation environment. Accordingly, the method may include generating an intermediate result communicable between operations in the first operation set, and generating the first restricted output, the first unrestricted output, or a combination thereof upon execution of the first operation set. Therefore, the present embodiments advantageously use existing computing resources that may be distributed in the automation environment.

In an embodiment, the method may include defining the communication operation to include an inversion control to provide that output of the trusted computing platform is not convertible to the restricted data. The method may include restricting conversion of a trusted platform output to the restricted data, where the trusted platform output includes the unrestricted data, the first restricted output, and/or the second unrestricted output. Therefore, the present embodiments provide an additional mechanism to confirm that the output from the trusted platform is not reverse engineerable. Accordingly, the present embodiments make it impossible to retrieve the restricted data or restricted output from the operations performed in the trusted computing platform.

In an embodiment, the method may include classifying the analytics operations as the second operation set. The second operation set is executed using the restricted data, the unrestricted data, the output from the first operation set, or any combination thereof to generate a second unrestricted output of the second operation set. The second unrestricted output is communicable outside the trusted platform by the communication operation. In an embodiment, the first operation set may result in a restricted output. The second operation set may transform the restricted output into the second unrestricted output. Such a mechanism may be suitable for analytics operations that are used for condition monitoring.

For example, the first operation set is configured to detect anomalies in the assets by identifying anomalous datapoints. The output of the first operation set may include the anomalous datapoints. The anomalous datapoints may be classified as restricted data. Accordingly, the second operation set may extract samples of the anomalous datapoints to render the samples of the anomalous datapoints as unrestricted data. The detected anomaly and the samples may be communicated outside the trusted computing platform via the communication operation. The present embodiments provide execution of the business logic within the trusted computing platform while avoiding exposure of the restricted data outside the trusted computing platform.

In an embodiment, the method may include enabling further execution of the applications using the unrestricted data, the first unrestricted output, the second unrestricted output, or any combination thereof. For example, the applications may be used to generate visual representation that indicate the condition of the assets. The present embodiments allow usage of the unrestricted data and unrestricted output from the trusted computing platform for such further processing.

The present embodiments include multiple aspects including data classification. Further, the applications using the data may be broken down into operations and/or functions. These operations are then classified based on the data that is used. Further, the computing resources linked to the automation environment are classifiable into trusted and non-trusted platforms. The unrestricted data and result of the operations of the applications are selectively transmitted outside trusted platform.

The present embodiments solve the problem of giving controlled access to restricted data in distributed computing environments. Further, by avoiding the overhead of data encryption, the present embodiments simplify execution of applications in cyber-physical systems. The present embodiments combine multiple technical approaches: identification of data to be protected, operations that require protected data and allows to chain functions across the trusted computing platform. For example, the present embodiments are well-suited for resource-efficient usage scenarios such as Edge computing and cost-limited on-premises server/cluster and cloud computing scenarios for machine tool data analytics and beyond.

The foregoing has outlined rather broadly the technical features of the present disclosure, so that those skilled in the art may better understand the detailed description that follows. Additional features and advantages of the disclosure that form the subject of the claims will be described hereinafter. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the scope of the disclosure in its broadest form.

DETAILED DESCRIPTION

Hereinafter, embodiments are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

As used hereinbelow, automation environment refers to an environment that includes multiple devices and assets. The devices may include interface devices, control devices, edge devices, Internet of Things (IoT) enabled devices that collect data from various sensors, and/or actuators deployed in the automation environment. It will be understood by a person skilled in the art that the automation environment is not only the physical entities but also the logical entities that define relationships between the devices and assets. Example automation environments include industrial automation environments with process automation and quality analytics. Other automation environments include milling and engineering automation environment, laboratory automation environment, building automation environment, etc.

Assets refer to systems and devices in the automation environment. The assets may be remotely located from the IoT platform. For example, the assets may be equipment, sensors, actuators, robots, and/or machinery in an industrial automation environment. The assets may also be medical devices and equipment in a healthcare automation environment. Further, the assets may be home appliances, office appliances, or systems in a building automation environment.

Figure 1:
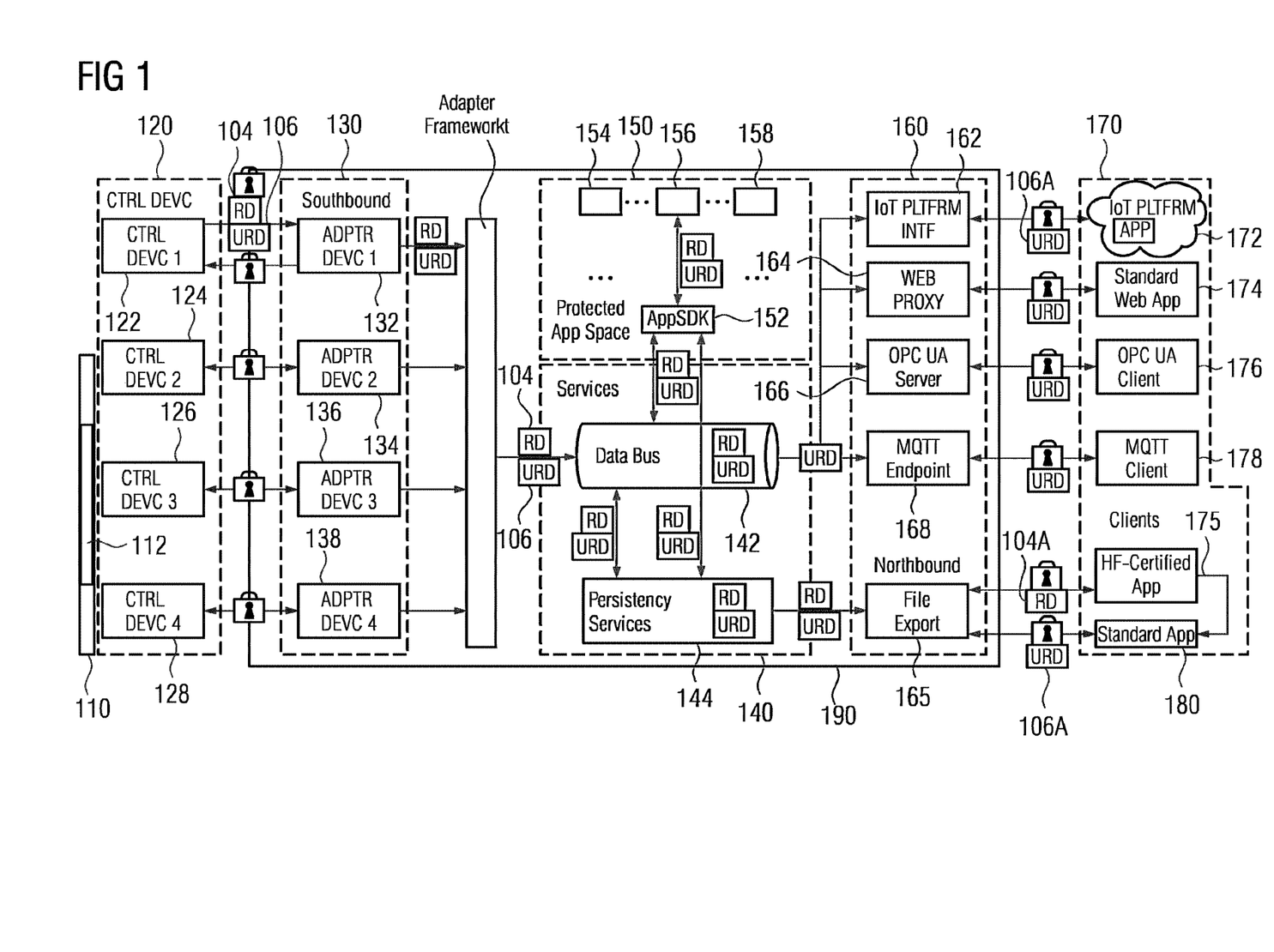
FIG. 1 illustrates a device for managing access to data associated with assets in an automation environment, according to an embodiment.

FIG. 1 illustrates a device 190 for managing access to data associated with assets 112 in an automation environment 110, according to an embodiment. The device 190 may be physically located within the automation environment 110 or external to the automation environment 110.

For example, in FIG. 1, the automation environment 110 is a process automation environment configured to enable process and quality analytics of workpieces in an industrial shop floor. Accordingly, the assets 112 include the workpieces and the machines associated with the workpieces. Further, the assets 112 may include the devices that enable quality analytics of the workpieces, such as sensors and actuators.

The device 190 is a gateway device that is configured to communicate with external users/clients 170 and the assets 112. The gateway device 190 is configured to monitor, modify, and control the assets 112 using control devices 120. In FIG. 1, the control devices 120 are individually referred to as control device 122, control device 124, control device 126, and control device 128. Process data from the assets 112 may be transmitted to the gateway device 190 via the control devices 120. In an embodiment, the control devices 120 may be used by themselves or together with the gateway device 190 to execute one or more features of the present embodiments. It will be understood by a person skilled in the art that process data is an example of the data that is appearing in the automation environment. The process data may be measured using sensors. Accordingly, the process data may include time-series sensor data and control data with control signals generated by the control devices 120.

The external users 170 include a combination of one or more clients that comprise of software applications hosted on an Internet of Things (IoT) platform 172 or a Website 174. Further, the clients may include an Open Platform Communications Unified Architecture (OPC UA) client 176 and a Message Queuing Telemetry Transport (MQTT) client 178. Other clients may include certified applications 175 and standard applications 180. The gateway device 190 may manage access of the process data of the assets 112. Accordingly, the gateway device 190 is configured to provide that the clients 172, 174, 175, 176, 178, and 180 do not get unencumbered access to the process data. Therefore, the present embodiments may protect the restricted data 104 from unauthorized access by the clients 170.

To provide that the process data is managed securely, the gateway device 190 is configured to recognize whether the process data is restricted data 104 and unrestricted data 106. In an embodiment, the gateway device 190 is configured to identify the restricted data 104 based on one or more constraints associated with the process data and/or the computing resources (e.g., the external users 170). As used herein, the constraints refer to data size, velocity of the data (e.g., rate at which the data is generated and/or made available), time of data generation, location of data generation, asset generating the data, computing resources processing the data, time of data processing, type of the data, quality of the data, probability of correctness of the data, consistency of the data, completeness of the process data, structure of the process data, semantics of the process data, and confidentiality of the process data.

In an embodiment, the semantics of the process data is determined. The semantics is used to classify the process data into categories such as events or samples for process and condition parameters. Further, the semantics is used to build relationship between the assets 112, their components, and associated functions. For example, the gateway device 190 may be configured to determine that the sample category of high frequency, high accuracy sensor data is restricted data 104 if transmitted to the external users 170 at its original rate of generation. In another example, the gateway device 190 may be configured to determine the sample category of high accuracy sensor data is unrestricted data 106 if transmitted to the external users 170 at a slow sampling frequency of 10 seconds.

It will be appreciated by a person skilled in the art that the identification of restricted data 104 and unrestricted data 106 may also be performed by the control devices 120. The control devices 120 may be configured to determine the restricted data 104 and indicate a confidentiality metric to enable the gateway device 190 to restrict access accordingly.

To perform the present embodiments, the device 190 may be configured to include a southbound interface 130 and a north bound interface 160. The southbound interface 130 may include physical and logical adaptors 132, 134, 136, and 138 that are able to communicate with the control devices 122, 124, 126, 128, respectively. Similarly, the northbound interface 160 includes client interfaces 162, 164, 166, and 168 for the IoT platform 172, the Website 174, the OPC UA client 176, and the MQTT client 178. Further, the northbound interface 160 includes a file export interface 165 that is configured to transmit restricted data 104A to the certified application 175 and unrestricted data 106A to the standard application 180. It will be appreciated by a person skilled in the art that the restricted data 104 and 104A may be same, similar, or different based on the operations performed by the gateway device 190. Similarly, the unrestricted data 106 and 106A may be same, similar, or different based on the operations performed by the gateway device 190.

The gateway device 190 is further configured with a services module 140. The services module 140 includes a data-bus module 142 and a persistency service module 144. In an embodiment, the data-bus module 142 is configured to enable access to the unrestricted data 106A to the external users 172, 174, 176 and 178. In an embodiment, the persistency service module 144 is used as a database to store restricted data 104A and/or unrestricted data 106A generated during runtime of applications.

Figure 2:
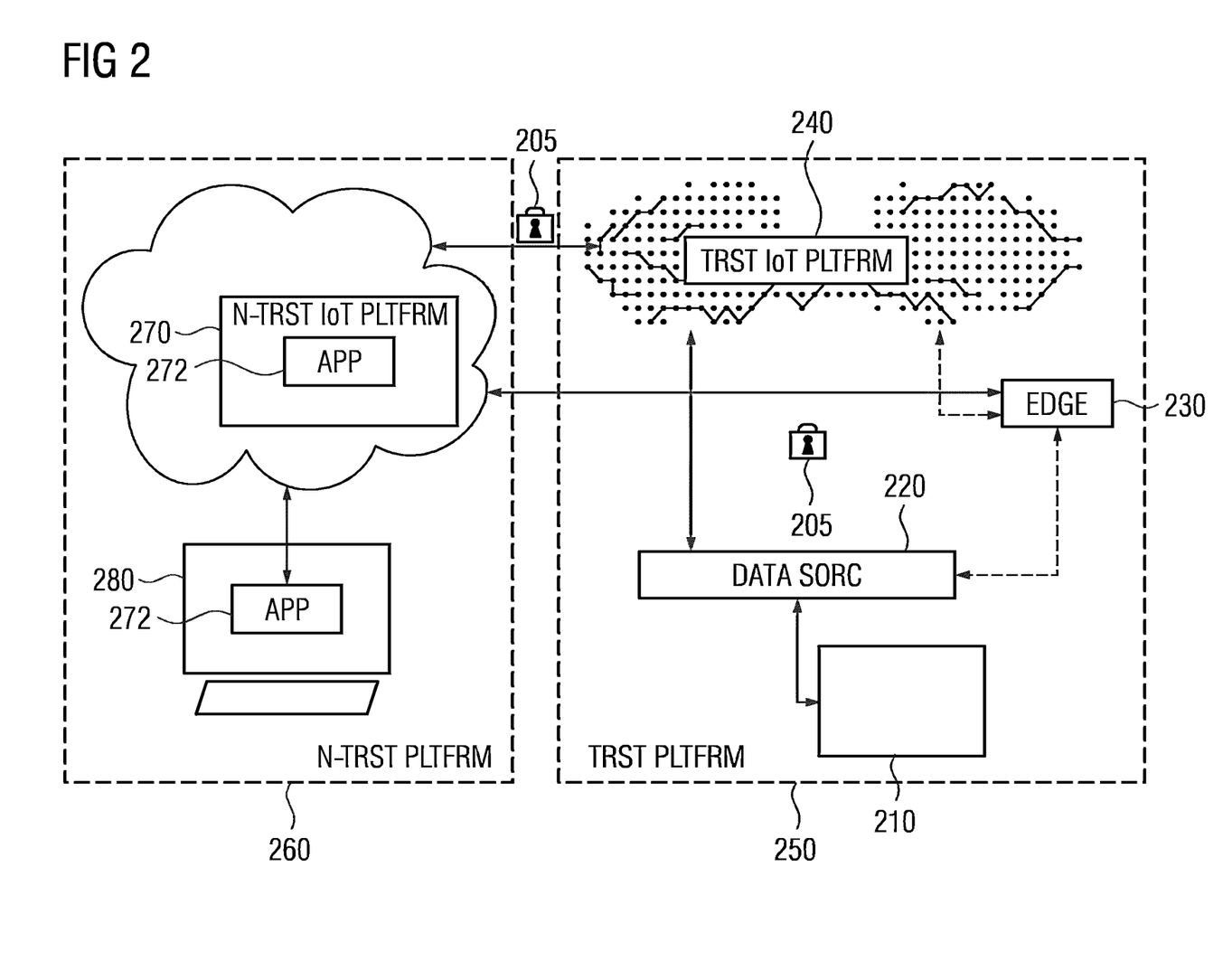
FIG. 2 illustrates trusted computing platform and non-trusted computing platform, according to an embodiment.

Further, the persistency module may include a trusted processing module that is configured to implement the method described in the present embodiments. The persistency service module 144 may be further configured to export a log of the restricted data 104A to the certified application 175 and export a log of the unrestricted data 106A to both the certified application 175 and the standard application 180. In an embodiment, the certified application 175 may be identified based on confidentiality restrictions imposed on its usage. Accordingly, the gateway device 190 identifies the certified application 175 to be part of a trusted platform and therefore makes the restricted data 104A available to the certified application 175. FIG. 2 describes how a trusted platform and a non-trusted platform are determined.

The gateway device 190 also includes an application module 150, where multiple applications 154, 156 and 158 may be executed using an application development/execution module 152. It will be appreciated by a person skilled in the art that the applications 154, 156 and 158 may also include instances of the respective applications. In an embodiment, instances of the applications hosted on the IoT platform 172 may be executed in the application module 150. Accordingly, the gateway device 190 may bring the function of the applications in IoT platform 172 to a secure processing environment (e.g., the trusted computing platform). Therefore, the applications are executed without having to encrypt the restricted data 104, thereby reducing compute overhead.

The gateway device 190, the control devices 120, and the assets 112 and the IoT platform 172 may also be referred to as computing resources. In the present embodiments, the computing resources are classified as the trusted computing platform and/or a non-trusted computing platform based on a trust policy. The trust policy may be between the computing resources, and may depend on communication protocol, digital certificates, and/or cryptographic signatures associated with the data and/or the computing resources.

FIG. 2 illustrates trusted computing platform 250 and non-trusted computing platform 260, according to an embodiment.

The trusted platform 250 includes assets 210, data gathering devices 220, an edge computing device 230, and an IoT platform 240 hosting and application 242. The non-trusted platform 260 includes an external IOT platform 270 that hosts an application 272 to monitor the asset 210. The non-trusted platform 260 also includes a user device 280 that may interact with the application 272 hosted on the external IOT platform 270.

The IoT platform 240 is classified to be part of the trusted computing 250 platform based on a trust policy between the data gathering devices 220, the edge computing device 230, and the IoT platform 240. The trust policy depends on the communication protocol used for communication between the IOT platform 240 and the devices 220 and 230. Further, the trust policy may depend on digital certificates, cryptographic signatures associated with the devices 220, 230 and the platform 240. Further, the trust policy may depend on the certificates or signatures associated with the data associated with the assets 210.

For example, the IoT platform 240 is configured to communicate with one the edge devices 230 and/or the data gathering devices 220 using Transport Layer Security (TLS) protocol, which provides communications security. Further, the IoT platform 240 may be configured to operate on the asset data with cryptographic signatures/extension. In such an example, the IoT platform 240 may be classified to be within the trusted platform 250.

In another example, the IoT platform 240 is built on a distributed computing infrastructure with the governance model based on International Standards Organization (ISO), National Institute of Standards and Technology (NIST), and Federal Information Processing Standards (FIPS). Further, the edge devices 230 and/or the data gathering devices 220 may be configured based on ISO, NIST, and FIPS. Accordingly, in such an example, the IoT platform 240 may be classified to be within the trusted platform 250.

In another example, the IoT platform 240 belongs to the computing infrastructure of a third party who is certified in a legal and technical way by the owner of the gathering devices 220 who is thus putting trust in the IoT platform 240 of the third party. If the IoT platform 240 itself and all communication between the IoT platform 240 and gathering devices 220 is secured from a legal and technical perspective, then accordingly, in such an example, the IoT platform 240 may be classified to be within the trusted platform 250.

Figure 3:
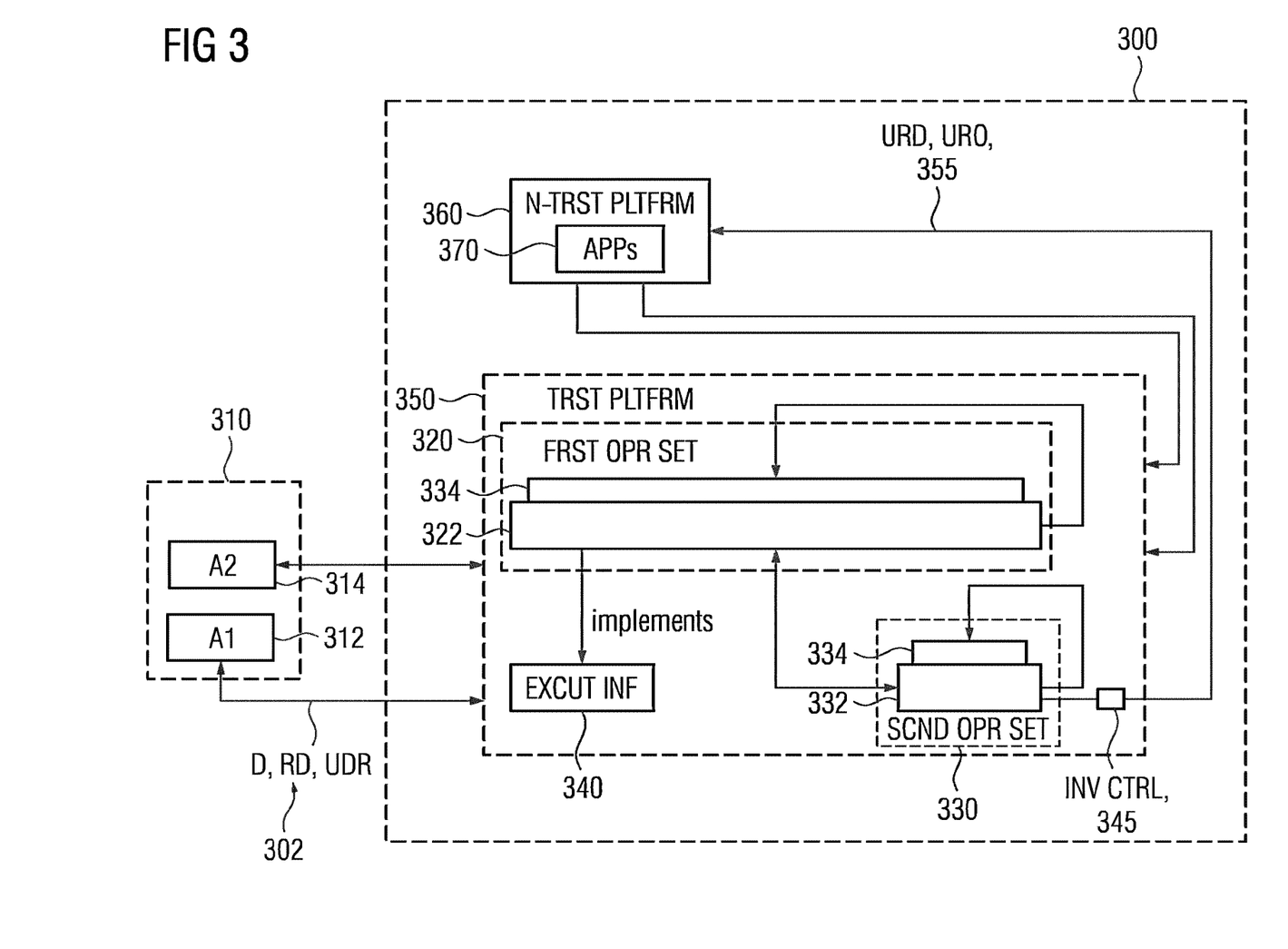
FIG. 3 illustrates a system for managing access to data associated with assets in an automation environment, according to an embodiment.

FIG. 3 illustrates a system 300 for managing access to data associated with assets 312, 314 in an automation environment 310, according to an embodiment. The data associated with the assets 312 and 314 and the automation environment 310 may be restricted data or unrestricted data and is collectively referred to as data 302.

The system 300 includes a trusted computing platform 350 and a non-trusted computing platform 360. The non-trusted platform 360 is configured to host one or more applications 370. The applications 370 that may be used to perform one or more operations associated with the assets 312 and 314 and/or the automation environment 310. The applications 370 are executed based on an output 355 from the trusted platform 350.

The trusted platform 350 may include a plurality of computing devices such as control devices, edge devices, and/or trusted IoT platform. The trusted platform 350 may be comparable to the trusted platform 250. The trusted platform 350 may be identified using a trust policy as disclosed herein above.

The operation of the trusted platform 350 is described in terms of a first operation set 320, a second operation set 330, an execution interface 340, and an inversion control module 345. A person skilled in the art will understand that a combination of an IoT platform and one or more edge devices may be configured to the above-mentioned operation. The output 355 of the trusted platform 350 includes unrestricted data associated with the assets 312, 314 and/or unrestricted results/output from the first operation set 320 and/or the second operation set 330.

During runtime, the system 300 may operate as follows. The applications 370 are analyzed and represented as one or more analytics operations. The applications 370 are represented as the analytics operations based on an input data required for the applications 370, a predicted output data from the applications 370, and a transformation function between the input data and the output data.

For example, the application 370 is a condition monitoring application. The condition monitoring application 370 may perform analytics operations including reading the data 302 to identify vibration data and analyzing the vibration data for deviations. In the above example, the read and analysis operations execute application-specific logic associated with the condition monitoring application 370. The analytics operations that execute the logic of the application 370 are classified as a first operation set 320 and executed by the trusted platform 350. Nonlimiting examples of the application-specific logic may include mathematical equations, relational/continuous query, rule-based mapping of the data 302, constraint-solving logic, mathematical optimization logic, and/or reasoning logic.

For the classification of the analytics operations, it may be required to determine in parallel or in prior whether the data 302 is restricted data or unrestricted data. Accordingly, the system 300 may be configured to identify the restricted data based on one or more constraints associated with the data 302 and/or the computing resources 350, 360. For example, the constraints include data size of the data 302, velocity of the data 302, time of data generation, location of data generation, assets generating the data 302, computing resources processing the data, time of data processing, type of the data, quality of the data, probability of correctness of the data, consistency of the data, completeness of the data, structure of the data, semantics of the data 302, and/or confidentiality of the data 302.

Considering the example of the condition monitoring application 370. The vibration data used for execution of the application 370 may be classified as restricted data if the vibration data is generated faster than 10000 datapoints/second. Alternatively, if the vibration data is associated with asset 312 (e.g., classified as a sensitive asset), then the vibration data is classified as restricted data. The aforementioned examples are not limiting. A person skilled in the art will understand that there will be multiple such examples that may be used to explain how the data 302 may be classified as the restricted data.

The analytics operations as the first operation set 320 is based on the availability of the data 302 for the execution of the analytics operations. By classifying the analytics operations as the first operation set 320, the logic of the application 370 is executed using either the restricted data and/or the unrestricted data. Accordingly, the logic of the application 370 is deployed within the trusted platform 350.

In an embodiment, an intermediate result may be generated in the first operation set 320. For example, the first operation set 320 includes operation 322 and operation 324. An intermediate result may be generated by the operation 322 and communicated to the operation 324. A person skilled in the art would understand that the operation 322 may be performed on one computing resource while the operation 324 may be performed on the same or another computing resource.

The result/output of the first operating set 320 may include a first unrestricted output of the first operation set 320 and/or a first restricted output of the first operation set. Accordingly, it may be understood that the output of the first operation set 320 may be restricted, unrestricted, or both. For example, the first operation set 320 may output an aggregated vibration data, metadata of the vibration data, and a deviation detected in the vibration data. The aggregated vibration data and the detected deviation may be considered as the first unrestricted output. The data points associated with the detected deviation and the vibration metadata may be considered as the first restricted output.

As shown in FIG. 3, the first operation set 320 communicates only with the execution interface 340 and the second operation set 330. The first operation set 320 does not communicate outside the trusted platform 350. Further, the first unrestricted output is communicated outside the trusted platform 350 via the second operation set 330.

Accordingly, the system 300 provides that restricted data and unrestricted data is accessed for executing logic of the application 370. The system also provides that the output of the first operation set 320 is within the trusted platform 350. Therefore, the first operation set 320 acts like a protected applications space for the execution of logic of the application 370.

The execution interface 340 may be configured as a runtime interface. The execution interface 340 defines a common life-cycle management for the analytics operations. Further, the execution interface 340 provides connectivity to the assets 312, 314. Further, the execution interface 340 may be configured to process the data 302.

In an embodiment, the analytics operations may be classified as the second operation set 330. The second operation set 330 includes operation 332 and 334. The second operation set 330 outputs a second unrestricted output. The second operation set 330 operates in a similar manner as the first operation set 320. Further, the second operation set 330 may include a communication operation that enables communication of the unrestricted data and the second unrestricted output outside the trusted platform 350. Accordingly, the analytics operations that use either the restricted data, the unrestricted data, or the output of the first operation set 320 to generate an unrestricted output may be classified as the second operation set 330.

Accordingly, the system 300 may classify operations of the application 370 into two types. The first operation type is able to process and execute the logic associated with the application 370. This is referred to as the first operation set 320. The second operation type is able to process and may also execute the logic and is capable of communicating the results of the operations back to the application 370 that is hosted on the non-trusted platform 360. This is referred as the second operation set 330. Since the first operation set 320 may only communicate within the trusted platform 350, encryption overhead may be reduced. Further, the second operation set 330 may communicate data outside the trusted platform 350 only in a controlled manner and therefore protects the privacy of the data 302.

Before the output 355 is communicated outside the trusted platform 350, an inversion check is performed. The inversion control module 345 is configured to detect and restrict conversion of the output 355 to the restricted data or the first restricted output. In an embodiment, the inversion control module 345 may include modules for automated checks when deploying the logic of the application 370 within the trusted platform 350. In another embodiment, manual review may be performed prior to deploying the logic of the application 370 within the trusted platform 350. For example, the inversion check interface 345 is configured to perform reviews on code of the application 370 to provide that the restricted data cannot be reconstructed from the output 355.

In an embodiment, the inversion check may also be performed by the second operation set 330. By restricting conversion of the output 355, reproduction of the restricted data is avoided. Thereby, unauthorized use of the restricted data or the first restricted output outside the trusted platform 350 may be prevented.

Figure 4:
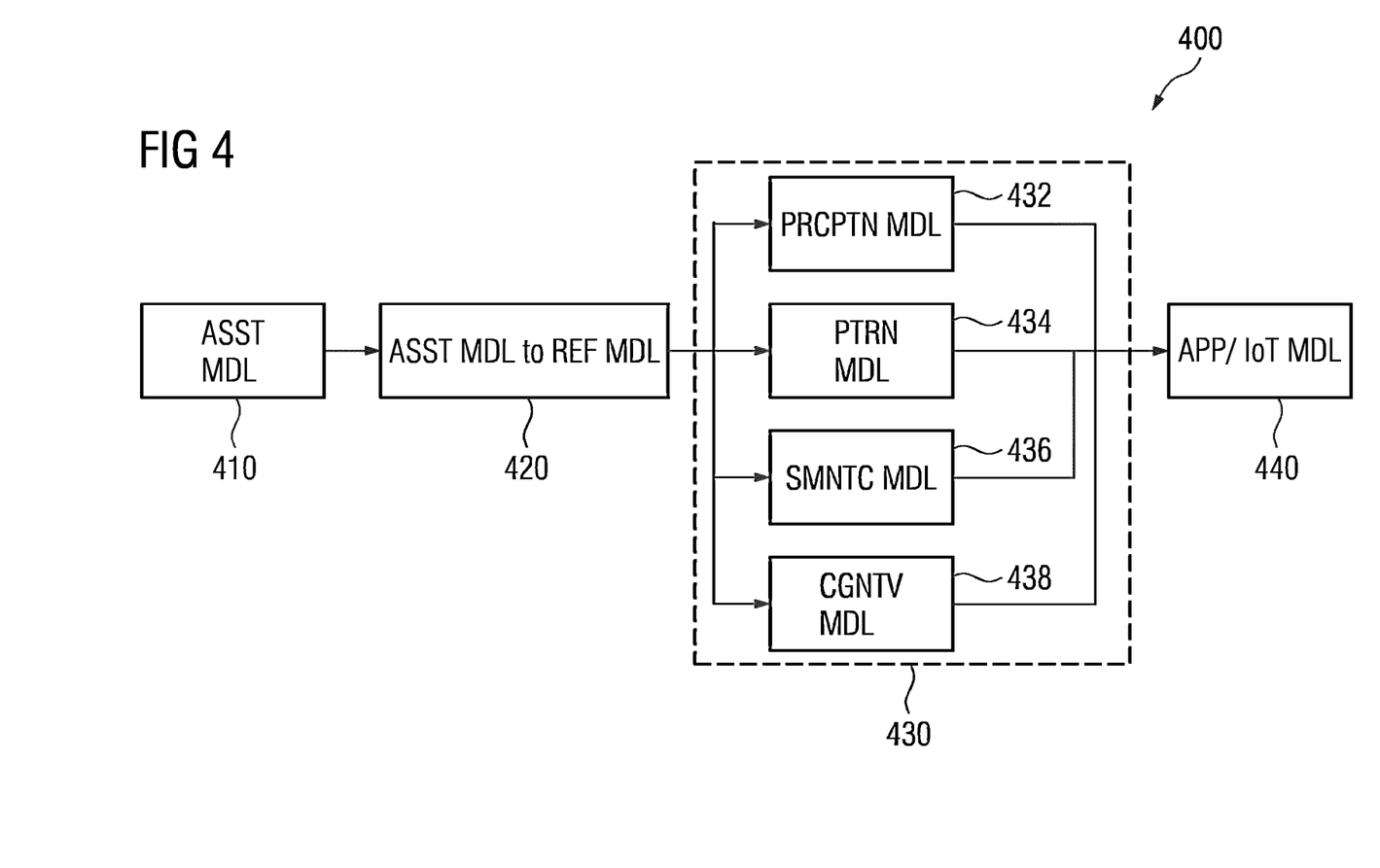
FIG. 4 illustrates a data model to enable management of access to the data by the system in FIG. 3, according to an embodiment.

FIG. 4 illustrates a data model 400 to enable management of access to the data 302 by the system 300 in FIG. 3, according to an embodiment. The data model 400 includes multiple levels indicating the flow of the data 302 from a component level that is assets 312, 314 to a platform level. Accordingly, the asset model 410 may be generated specific to the assets 312 and 314. The asset model 410 is then converted or mapped to reference model 420. The mapping to the reference model 420 may be performed using a generic data model tool 430. The generic data model tool 430 may include perception model 432, a pattern model 434, semantic model 436, and cognitive model 438. This is then converted from the generic data model to an IoT model or an application-specific model 440. By this, the application 370 is executed using the output 355.

A person skilled in the art would understand that multiple data modelling techniques may be used to implement the aforementioned data model 400. For example, the semantic model 436 may identify the datapoints in the data 302 by type of asset, asset name, type of data point, type of parameter. The semantic model 436 may be implemented using a knowledge graph. In another example, the pattern model 434 may use computational processes to discover patterns in the data 302 using machine learning and statistic based techniques.

Accordingly, the system 300 is configured to determine the data model 440 specific to the application 370 and is able to map the data 302 to the data model 440.

Figure 5:
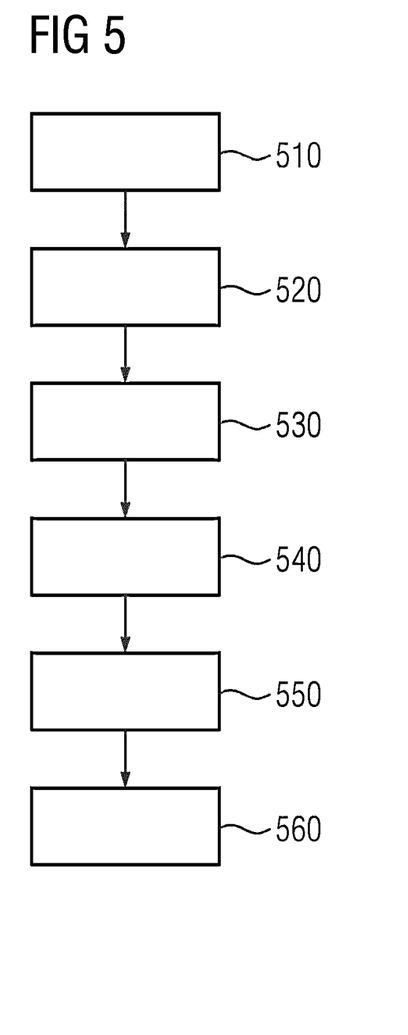
FIG. 5 illustrates a method for managing access to data associated with assets in an automation environment, according to an embodiment.

FIG. 5 illustrates a method for managing access to data associated with assets in an automation environment, according to an embodiment. The method begins at act 510 with representing an application as one or more analytics operations. The application may be hosted on a computing resource that may not be trusted. The determination of a trusted computing resource and a non-trusted computing resource may be performed prior or at act 510. Further, at act 510, the analytics operations are classified into a first operation set based on an input data required for the application, a predicted output data, and the transformation function between the input data and the output data.

At act 520, logic of the application is executed by the first operation set using restricted data and/or the unrestricted data associated with assets in the automation environment.

At act 530, an output of the first operation set is generated based on the executed logic. The output is classified either as a first restricted output or a first unrestricted output.

At act 540, the analytics operations may be classified into a second operation set to generate a second unrestricted output. The analytics operations in the second operation set are executed using the restricted data, the unrestricted data, and/or the output from the first operation set. The second operation set provides that the restricted data and/or the first restricted output is converted to the second unrestricted output. In other words, the restricted data/output is converted to unrestricted output.

At act 550, conversion of the second unrestricted output to the restricted data and/or the first restricted output is checked. The check determines whether the restricted data and/or the first restricted output may be reconstructed from the second unrestricted output. If yes, restrictions are imposed on the analytics operations to provide that reconstruction of the first restricted output and/or the restricted data is not possible.

At act 560, further, the execution of the application is enabled using either the unrestricted data and/or the second unrestricted output. The execution of the application is unable by transmitting the unrestricted data and/or the second unrestricted output to the computing device hosting the application.

Figure 6:
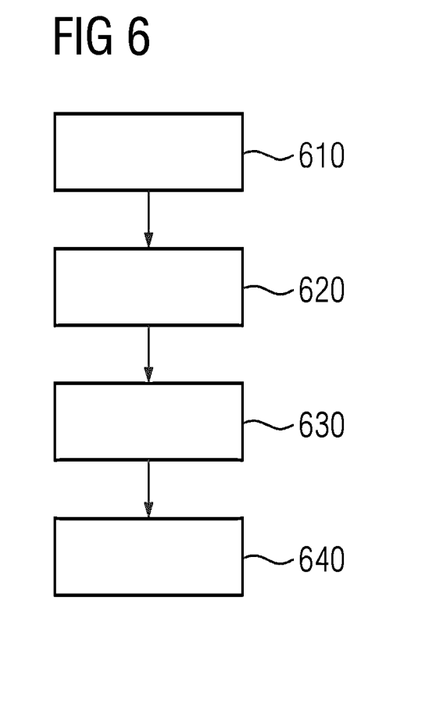
FIG. 6 illustrates a method for managing access to data associated with assets in an automation environment, according to an embodiment.

FIG. 6 illustrates a method for managing access to data associated with assets in an automation environment, according to an embodiment. The method begins at act 610 by identifying the restricted data associated with the assets based on one or more constraints. The constraints may be associated with the data associated with the assets. Further, the constraints may be associated with the computing resources in the automation environment or the computing resources hosting the application. For example, the constraints includes at least one of data size, velocity of the data, time of data generation, location of data generation, assets generating the data, computing resources processing the data, time of data processing, type of the data, quality of the data, probability of correctness of the data, consistency of the data, completeness of the data, structure of the data, semantics of the data, and confidentiality of the data.

At act 620, the analytics operations of the application are classified based on the requirement of the restricted data for execution.

At act 630, the computing resources are classified as a trusted computing platform or a non-trusted computing platform based on a trust policy. The trust policy may be between the computing resources. For example, the trust policy may depend on communication protocol digital certificates and/or cryptographic signatures associated with the data and/or the computing resources. For the purpose of explaining the present embodiments, the application is hosted on the non-trusted computing platform.

At act 640, the analytics operations of the application are executed within the trusted computing platform such that an unrestricted output is generated from the trusted computing platform. The unrestricted output is transmitted to the application for further processing.

The present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device), or propagation mediums in and of themselves as signal carriers are not included in the definition of physical computer-readable mediums, which include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for managing access to data associated with assets in an automation environment, wherein the data comprises one of restricted data and unrestricted data, wherein the restricted data includes sensitive and unprotected data, and wherein the automation environment is accessible via one or more computing platforms comprising a plurality of computing resources that are classifiable into a trusted computing platform and a non-trusted computing platform, the method comprising:

representing applications as analytics operations based on one of an input data required for the applications, a predicted output data, a transformation function between the input data, and the output data;

classifying the analytics operations performable on the data into a first operation set based on a requirement of restricted data for execution of the analytics operations, the first operation set being executable on the trusted computing platform, wherein the analytics operations are associated with one or more applications executable on at least one of the one or more computing platforms; and enabling access to at least one of the unrestricted data and a first unrestricted output of the first operation set from the trusted computing platform by a communication operation, wherein classifying the analytics operations includes determining restricted data in relation to the analytics operations based on one or more constraints associated with the data, the computing resources, or the data and the computing resources, and wherein the one or more constraints comprise data size, velocity of the data, time of data generation, location of data generation, assets, or any combination thereof.

2. The method of claim 1, further comprising:
executing logic of the applications by the first operation set using the restricted data, the unrestricted data, or the restricted data and the unrestricted data; and
generating an output of the first operation set based on the executed logic,
wherein the output is classifiable as a first restricted output and the first unrestricted output.

3. The method of claim 2, further comprising:
executing the logic using the restricted data, the unrestricted data, or the restricted data and the unrestricted data associated with the assets;
generating an intermediate result communicable between operations in the first operation set; and
generating the first restricted output, the first unrestricted output, or the first restricted output and the first unrestricted output.

4. The method of claim 1, further comprising:
classifying the analytics operations as a second operation set that is executed using the restricted data, the unrestricted data, the output from the first operation set, or any combination thereof, such that a second unrestricted output of the second operation set is generated, wherein the second unrestricted output is communicable outside a trusted platform by the communication operation.

5. The method of claim 4, wherein classifying the analytics operations performable on the data into the first operation set comprises:
generating the data, computing resources processing the data, time of data processing, type of the data, quality of the data, probability of correctness of the data, consistency of the data, completeness of the data, structure of the data, semantics of the data, and confidentiality of the data; and
classifying the analytics operations as the first operation set based on requirement of the restricted data for the execution of the analytics operations.

6. The method of claim 5, wherein identifying the restricted data in the data associated with the assets comprises:
identifying high-frequency signals in the data as the restricted data based on a frequency threshold;
identifying high bandwidth datapoints in the data as the restricted data based on a bandwidth threshold of at least one of the computing resources; or
a combination thereof.

7. The method of claim 1, further comprising:
classifying the plurality of computing resources as the trusted computing platform, a non-trusted computing platform, or the trusted computing platform and the non-trusted computing platform based on a trust policy between the computing resources,
wherein the trust policy depends on communication protocol, digital certificates, cryptographic signatures associated with the data, the computing resources, or the data and the computing resources, or any combination thereof.

8. The method of claim 1, further comprising:
enabling further execution of the applications using at least one of the unrestricted data, the first unrestricted output and the second unrestricted output.

9. The method of claim 1, further comprising:
restricting conversion of a trusted platform output to the restricted data, wherein the trusted platform output comprises the unrestricted data, the first restricted output, the second unrestricted output, or any combination thereof.

10. A device for managing access to data associated with assets in an automation environment, wherein the data comprises one of restricted data and unrestricted data, wherein the restricted data includes sensitive and unprotected data, and wherein the automation environment is accessible via one or more computing platforms comprising a plurality of computing resources that are classifiable into a trusted computing platform and a non-trusted computing platform, the device comprising:
an operating system; and
a trusted processing module comprising computer-readable instructions executable by the operating system to manage access to the data associated with the assets in the automation environment, the computer-readable instructions comprising:
representing applications as analytics operations based on one of an input data required for the applications, a predicted output data, a transformation function between the input data, and the output data;
classifying the analytics operations performable on the data into a first operation set based on a requirement of restricted data for execution of the analytics operations, the first operation set being executable on the trusted computing platform, wherein the analytics operations are associated with one or more applications executable on at least one of the one or more computing platforms; and
enabling access to at least one of the unrestricted data and a first unrestricted output of the first operation set from the trusted computing platform by a communication operation,
wherein classifying the analytics operations includes determining restricted data in relation to the analytics operations based on one or more constraints associated with the data, the computing resources, or the data and the computing resources, and
wherein the one or more constraints comprise data size, velocity of the data, time of data generation, location of data generation, assets, or any combination thereof.

11. The device of claim 10, wherein the trusted computing platform comprises the device.

12. The device of claim 10, further comprising:
a data bus configured to:
communicate the data associated with the assets to the trusted processing module; and
communicate the unrestricted data to one or more applications hosted on one of the one or more computing platforms.

13. A system for managing assets in an automation environment, the system comprising:
one or more computing devices configured to execute one or more applications for managing the assets, wherein the one or more computing devices are classifiable into a trusted computing platform and a non-trusted computing platform based on a trust policy, and wherein the trusted computing platform comprises at least one device for managing access to data associated with the assets in the automation environment, wherein the data comprises one of restricted data and unrestricted data, wherein the restricted data includes sensitive and unprotected data, and wherein the automation environment is accessible via one or more computing platforms comprising a plurality of computing resources that are classifiable into a trusted computing platform and a non-trusted computing platform, a device of the at least one device comprising:
an operating system; and
a trusted processing module comprising computer-readable instructions executable by the operating system to manage access to the data associated with the assets in the automation environment, the computer-readable instructions comprising:
representing applications as analytics operations based on one of an input data required for the applications, a predicted output data, a transformation function between the input data, and the output data;
classifying the analytics operations performable on the data into a first operation set based on a requirement of restricted data for execution of the analytics operations, the first operation set being executable on the trusted computing platform, wherein the analytics operations are associated with one or more applications executable on at least one of the one or more computing platforms; and
enabling access to at least one of the unrestricted data and a first unrestricted output of the first operation set from the trusted computing platform by a communication operation,
wherein classifying the analytics operations includes determining restricted data in relation to the analytics operations based on one or more constraints associated with the data, the computing resources, or the data and the computing resources,
wherein the one or more constraints comprise data size, velocity of the data, time of data generation, location of data generation, assets, or any combination thereof,
wherein the trusted computing platform comprises the device, and
wherein the trusted computing platform is an integrated trusted platform.

14. In a non-transitory computer-readable storage medium that stores machine-readable instructions executable by a processor to manage access to data associated with assets in an automation environment, wherein the data comprises one of restricted data and unrestricted data, wherein the restricted data includes sensitive and unprotected data, and wherein the automation environment is accessible via one or more computing platforms comprising a plurality of computing resources that are classifiable into a trusted computing platform and a non-trusted computing platform, the machine-readable instructions comprising:
representing applications as analytics operations based on one of an input data required for the applications, a predicted output data, a transformation function between the input data, and the output data;
classifying the analytics operations performable on the data into a first operation set based on a requirement of restricted data for execution of the analytics operations, the first operation set being executable on the trusted computing platform, wherein the analytics operations are associated with one or more applications executable on at least one of the one or more computing platforms; and
enabling access to at least one of the unrestricted data and a first unrestricted output of the first operation set from the trusted computing platform by a communication operation,
wherein classifying the analytics operations includes determining restricted data in relation to the analytics operations based on one or more constraints associated with the data, the computing resources, or the data and the computing resources, and
wherein the one or more constraints comprise data size, velocity of the data, time of data generation, location of data generation, assets, or any combination thereof.

15. The non-transitory computer-readable storage medium of claim 14, wherein the machine-readable instructions further comprise:
executing logic of the applications by the first operation set using the restricted data, the unrestricted data, or the restricted data and the unrestricted data; and
generating an output of the first operation set based on the executed logic,
wherein the output is classifiable as a first restricted output and the first unrestricted output.

16. The non-transitory computer-readable storage medium of claim 15, wherein the machine-readable instructions further comprise:
executing the logic using the restricted data, the unrestricted data, or the restricted data and the unrestricted data associated with the assets;
generating an intermediate result communicable between operations in the first operation set; and
generating the first restricted output, the first unrestricted output, or the first restricted output and the first unrestricted output.

17. The non-transitory computer-readable storage medium of claim 14, wherein the machine-readable instructions further comprise:
classifying the analytics operations as a second operation set that is executed using the restricted data, the unrestricted data, the output from the first operation set, or any combination thereof, such that a second unrestricted output of the second operation set is generated,
wherein the second unrestricted output is communicable outside a trusted platform by the communication operation.

18. The non-transitory computer-readable storage medium of claim 17, wherein classifying the analytics operations performable on the data into the first operation set comprises:
generating the data, computing resources processing the data, time of data processing, type of the data, quality of the data, probability of correctness of the data, consistency of the data, completeness of the data, structure of the data, semantics of the data, and confidentiality of the data; and classifying the analytics operations as the first operation set based on requirement of the restricted data for the execution of the analytics operations.

* * * * *